United States Patent [19]

Panson et al.

[11] Patent Number: 4,594,215
[45] Date of Patent: Jun. 10, 1986

[54] AUGMENTED HIGH GRADIENT MAGNETIC FILTER

[75] Inventors: Armand J. Panson, Aspinwall; Michael Troy, Leechburg, both of Pa.

[73] Assignee: Westinghouse Electric Corp., Pittsburgh, Pa.

[21] Appl. No.: 549,124

[22] Filed: Nov. 4, 1983

[51] Int. Cl.$^4$ .............................................. B01D 17/06
[52] U.S. Cl. ...................... 376/315; 210/223; 210/243; 210/450; 210/446; 210/695; 210/748; 277/167.5; 277/191; 204/186
[58] Field of Search ............... 210/695, 222, 223, 243, 210/435, 748, 446, 450; 277/167.5, 190, 191; 55/2; 376/305, 315, 463

[56] References Cited

U.S. PATENT DOCUMENTS

| | | | |
|---|---|---|---|
| 3,059,910 | 10/1962 | Moriya | 210/222 |
| 3,129,157 | 4/1964 | Loeckenhoff | 204/299 R |
| 3,214,201 | 5/1962 | Fonda | 277/167.5 |
| 3,585,122 | 6/1971 | King | 204/186 |
| 3,679,973 | 7/1972 | Smith, Jr. et al. | 55/146 |
| 3,687,834 | 8/1972 | Candor | 204/299 R |
| 3,719,583 | 3/1973 | Ustick | 210/222 |
| 3,873,448 | 3/1975 | Isberg et al. | 210/222 |
| 3,954,589 | 5/1976 | Aber et al. | 204/186 |
| 4,098,673 | 7/1978 | Zucker | 204/167 |
| 4,238,326 | 12/1980 | Wolf | 210/748 |
| 4,247,398 | 1/1981 | Mohri | 210/222 |
| 4,345,179 | 8/1982 | Asai et al. | 313/136 |
| 4,347,110 | 8/1982 | Joyce et al. | 210/748 |
| 4,406,467 | 9/1983 | Burger et al. | 277/167.5 |

FOREIGN PATENT DOCUMENTS

| | | | |
|---|---|---|---|
| 0078499 | 5/1983 | European Pat. Off. | 210/695 |
| 0580871 | 11/1977 | U.S.S.R. | 210/223 |

OTHER PUBLICATIONS

J. W. Davenport et al., "On-Site Pilot Tests of a SA-LA-HGMF Magnetic Filter at New England Power Company, Brayton Point Station" *Proc. Int. Water Conf.* (38th), Pittsburgh, PA, (1977), pp. 159–173.
J. A. Oberteuffer, "Magnetic Separation: A Review of Principles, Devices, and Applications", *IEEE Trans. on Mag.*, vol. Mag-10, (1974), pp. 233–238.
R. E. Palmer, et al., "Magnetic Filtration of Feedwater Corrosion Products", *American Power Conference*, vol. 40, Chicago (1978), pp. 969–975.
M. Troy, et al., "Study of Magnetic Filtration Applications to the Primary and Secondary Systems of PWR Plants", *Topical Report for EPRI Research Project TPS-76-665*, Westinghouse Electric Corporation WCAP-9123, (1978).
M. Troy, et al.; "Effect of High-Temperature Filtration on PWR Plant Radiation Fields", *Decontamination and Decommissioning of Nuclear Facilities*, (1980), pp. 633–647.
S. Kang et al., "An Evaluation of the Effectiveness of Reactor Coolant High Temperature Filtration in Reducing Radiation Exposures", D. N. Rodgers et al., "Performance of a High Temperature Magnetic Filter in a Boiling Water Reactor Pumped Forward Heater Drains", *42nd Annual International Water Conference*, Pittsburgh (1981), pp. 383–392.

*Primary Examiner*—Barry S. Richman
*Assistant Examiner*—Titus B. Ledbetter, Jr.
*Attorney, Agent, or Firm*—Daniel C. Abeles

[57] ABSTRACT

A high gradient magnetic filter is enhanced by the electrophoretic effect whereby the range of effectiveness of the conventional high gradient magnetic filter for collecting suspended magnetic solid particles from liquid streams, such as power plant coolant streams, is extended to collect suspended magnetic solid particles of submicron size as well as particulates not susceptible to a magnetic field gradient. A conventional high gradient magnetic filter is connected into a pipeline, through which a liquid stream containing the suspended solid particles to be removed is flowing, so that the filter is electrically insulated from the remainder of the pipeline, and a potential is applied to the filter to polarize same relative to the pipeline with a polarity which is opposite the polarity of the charged particles in the stream which are to be collected.

8 Claims, 2 Drawing Figures

NUCLEAR POWER PLANT COOLANT FLOW

AUGMENTED HIGH GRADIENT MAGNETIC FILTER

BACKGROUND OF THE INVENTION

The invention relates to an augmented magnetic filter or separator. More specifically, the present invention relates to a filter or separator which utilizes a combination of magnetic gradients and electrophoretic migration to remove suspended solids from liquid streams and, in particular, coolant streams for power plants, such as nuclear power plants.

In the operation of power plants, a maintenence problem exists due to the presence of corrosion products which form in the plant cooling system and which are then deposited on the surfaces of the cooling system. The problem is particularly acute in nuclear power plants wherein deposited primary cooling system corrosion products are associated with radiation exposure of operating and maintenance personnel and the high costs of maintenance of such power plants. These primary cooling system corrosion products are solids which are produced primarily by corrosion of the steam generator tubes and to a lesser extent by corrosion of the other stainless steel plant surfaces.

The corrosion product components are circulated with the primary coolant both as a suspended or insoluble solid phase and to some extent as ions in solution. Deposition of the solid phase particles takes place on the core surfaces and while in residence on the core, these solid phase particles become irradiated. Additionally, the soluble corrosion products may precipitate to add to the layer of solid phase particles already on the core. After being irradiated, the solid phase particles on the core become resuspended in the primary coolant solution and are thereafter deposited on the plant surfaces external to the core. There, the irradiated solid phase particles become the most important source of radiation exposure to personnel in the the power plant.

In a pressurized water reactor (PWR) nuclear power plant, both the primary and secondary coolant streams carry a burden of insoluble magnetic corrosion products. These corrosion products also carry a surface charge generally dependent on the pH of the coolant and, at least in the smaller particle sizes, are subject to electrostatic attraction which causes particles to adhere to the surfaces of the system.

The primary cooling system corrosion products are largely nickel ferrite and nickel ferrite with substitutions for part of the nickel of cobalt, manganese and other elements. Substitution of chromium for valence-III iron in the corrosion products has also been indicated. All these ferrites are ferrimagnetic and strongly attracted by a magnetic field gradient. In the secondary cooling system of such a nuclear power plant, as generally is the case for all power plants, the suspended solid corrosion products consist mainly of magnetite (or iron ferrite) which is likewise strongly magnetic. Also present in the secondary coolant system of most power plants is cupric oxide (CuO) which is weakly paramagnetic. All of these insoluble corrosion products have an important adverse effect on power plant availability and their removal from their respective systems is highly desirable.

Since the insoluble corrosion products are primarily magnetic, there has been considerable interest in using a magnetic filter to remove the suspended solids from power plant coolant streams. The applications of magnetic filters to the primary coolant stream of a nuclear power plant were reviewed by Troy et al, "Effects of High-Temperature Filtration on PWR Plant Radiation Fields" in DECONTAMINATION AND DECOMMISSIONING OF NUCLEAR FACILITIES (M. M. Osterhout), Plenum Press, New York, 1980, pages 633–647. Moreover, investigations of the application of magnetic filters to the secondary coolant streams of conventional power plants, but applicable to nuclear plants as well, were reported in articles by Davenport et al, "On-Site Pilot Tests of a SALA-HGMF Magnetic Filter at New England Power Company, Brayton Point Station", Proceedings of International Water Conference (38th), Pittsburgh, PA, 1977, pages 159–173, and Palmer et al, "Magnetic Filtration of Feedwater Corrosion Products", American Power Conference, Chicago, 1978, pages 969–975, and a comprehensive review and evaluation of magnetic filtration for both primary and secondary system purification was sponsored by the Electric Power Research Institute and reported by Troy et al, "Study of Magnetic Filtration Applications to the Primary and Seconary Systems of PWR Plants", EPRI Report, NP-514, May, 1978.

The magnetic filter conventionally used for removing such corrosion products from a power plant coolant stream generally includes a non-magnetic pressure vessel which contains a metal magnetic matrix and which is surrounded by a solenoid and associated magnetic yoke. The metal matrix is constructed so that it presents a large surface area and distorts the otherwise uniform field produced by the solenoid so as to cause steep gradients in the field directed toward the matrix surface. The pressure vessel is connected into the pipe containing the coolant stream so that the stream flows through the matrix and the magnetic particles are attracted to and deposited on the surface of the magnetic matrix.

In order to trap a particle from suspension on the matrix of the magnetic filter, the magnetic force acting on the particle must be greater than the drag force from the stream flowing through the filter. Moreover, it has been shown that for the optimum effect of such a high gradient magnetic filter on small paramagnetic particles, the radius of the matrix element on which the particle is to be collected should be approximately three times the radius of the particle to be captured. Obviously, for practical magnetic filter matrices the approach to optimum design falls off as the radius of the particles to be captured decreases. Thus, for the submicron (near colloidal) fractions of the primary and secondary corrosion products, the magnetic filter tends to become less effective.

It should be noted that in addition to highly magnetic and paramagnetic corrosion products, coolant streams of power plants often contain other suspended particles, such as diamagnetic corrosion products, e.g. cuprous oxide ($Cu_2O$) and nonmagnetic particles, e.g. silica, calcium and magnesium oxides, which it is desirable to remove from the coolant stream but which would not be expected to be trapped by a magnetic filter.

SUMMARY OF THE INVENTION

The present invention provides a method and apparatus whereby a conventional high-gradient magnetic filter is augmented so that its range of effectiveness for collecting or trapping suspended magnetic particles, e.g., corrosion product particles, is extended to colloidal sized particles and so that it is able to collect particulates not susceptible to a magnetic field gradient. More specifically, according to the invention, a conventional high gradient magnetic filter is augmented such that the smaller magnetic particles and nonmagnetic particles are removed by the filter by an electrophoretic deposition process.

The present invention is based on the recognitition of the following:

Particles suspended in solutions acquire surface charges as a consequence of surface hydrolysis reactions and adsorption of ions from the solution with the solution pH most generally controlling the polarity and extent of the surface charge for oxides. As the particle dimension becomes smaller, the surface charge becomes more and more important in determining the properties of the suspended particles. When the dimension of a suspended particle decreases to between 10 and 100 A (referred to as a colloidal particle), the surface charge becomes the most significant element in determining particle properties. Suspended charged particles, particularly of the dimensions of interest, move when placed in an electric field, a process referred to as electrophoresis. Finally, such suspended charged particles, as a consequence of their mobility in an applied electric field, may be removed from solution and collected or deposited on an electrode surface, i.e. by an electrophoretic deposition process.

According to the invention, the augmentation to achieve the electrophoretic deposition is basically achieved by connecting a high-gradient magnetic filter into a pipeline containing a liquid stream with magnetic and/or other charged particles to be removed so that the filter is electrically insulated from the pipeline, and by applying an electrical potential to the magnetic filter so as to polarize the filter relative to the pipeline with a polarity opposite that of the charge on the particles which are suspended in the stream and which it is desired to remove, whereby larger magnetic particles will be trapped by the filter due to the magnetic effect while smaller magnetic particles and nonmagnetic particles will be trapped by the filter due to electrophoretic deposition.

DETAILED DESCRIPTION OF THE PREFERRED EMBODIMENTS

Figure 1:
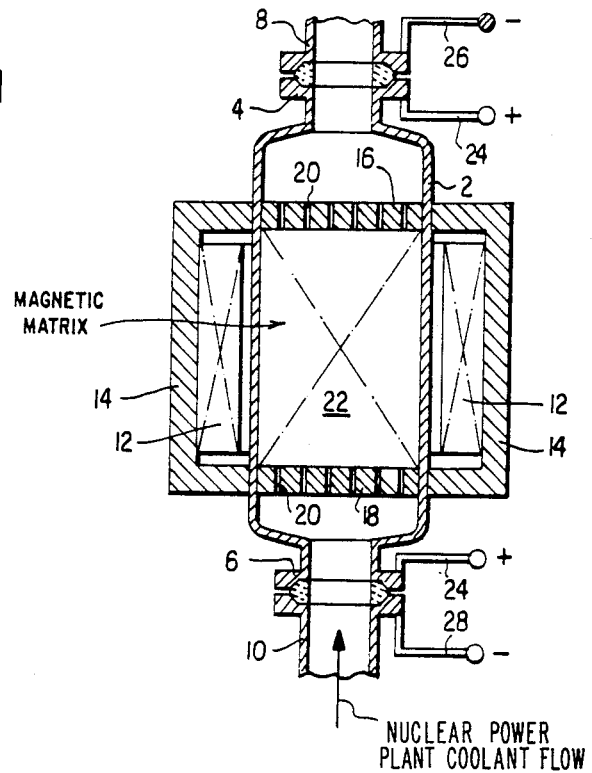
FIG. 1 is a schematic sectional view of a high gradient magnetic filter which has been augmented according to the invention.

Turning now to FIG. 1, there is shown a conventional high gradient magnetic filter which has been electrophoretically enhanced, according to the invention, for use in the cooling stream of a power plant, in particular a nuclear power plant. The high gradient magnetic filter includes a pressure vessel 2 which is generally cylindrical in shape and is open at each of its two ends, which terminate in connectors, e.g., conventional type flanges 4 and 6, for connecting the magnetic filter in a pipeline between respective lengths of pipe 8 and 10 of the pipeline. The pressure vessel 2 is formed of a metal which is nonmagnetic and which is corrosion resistant with respect to the coolant solution. Preferably, the pressure vessel 2 is formed from a stainless steel f the 300 series.

To produce the magnetic field within the pressure vessel 2, the magnetic filter includes a solenoid 12 which is concentric with the pressure vessel 2, and is in turn surrounded by an annular magnetic yoke 14 with a generally U-shaped cross section. Moreoever, disposed within the pressure vessel 2 are two circular magnetic pole pieces 16 and 18 which complete the magnetic circuit of the yoke 14, and which are each provided with a plurality of openings or perforations 20 extending parallel to the longitudinal axis of the pressure vessel 2 in order to distribute the flow of the coolant solution through the pressure vessel 2. Finally, the space within the pressure vessel 2 between the magnetic pole pieces 16 and 18 is filled with a matrix 22 of a magnetic material, for example, 400 series stainless steel, which is arranged such that it provides a large surface area for attraction and entrapment of the suspended magnetic particles in the solution flowing through the filter.

As indicated above, in order to attract the small suspended magnetic particles, steep gradients in the magnetic field are necessary. Accordingly, although the matrix 22 can take many forms and shapes, for example, the matrix can be formed of steel balls or steel wool, the matrix 22 preferably is formed of a ferromagnetic expanded metal mesh which has a large surface area composed of sharp edged filaments, as is conventional in modern high gradient magnetic filters. These sharp edged filaments distort the otherwise uniform magnetic field generated by the concentric solenoid 2 and its associated magnetic circuit 14, 16, 18, causing the desired steep gradients in the magnetic field which are directed toward the surface of the matrix 22. A high gradient magnetic filter generally constructed as indicated above is available fom Sala Magnetics, Inc. of Cambridge, Mass.

In order to electrophoretically enhance the conventionally high gradient filter described above, the filter is connected into the coolant pipeline in such a manner that the filter is electrically insulated or isolated from the remainder of the cooling system. This is achieved, as generally illustrated in FIG. 1, by connecting the flanges 4 and 6 to the associated flanges of the sections of pipe 8 and 10 so that no electrical connection exists between the mating flanges, i.e. in an electrically insulating manner. Additionally, the pressure vessel 2 and each of the sections of pipe 8 and 10 are provided with respective terminals 24, 26 and 28 so that a small D.C. potential can be applied between the filter and the remainder of the cooling system to electriclly charge the entire filter and polarize same relative to the remainder of the coolant system. The polarity of the voltage applied to the terminal 24 of the filter should be such that the metal portions of the filter form an electrode whose polarity is opposite that of the charged particulates which are suspended in the cooling solution and which are to be collected and removed. It is understood that the electrical connections 24, 26 and 28 need not necessarily be mounted on the respective flanges but are simply shown at these locations in the drawing in order to illustrate the difference in polarity between the filter and the remainder of the coolant system. Of course, the relative polarity of the filter may be opposite that shown in FIG. 1.

In operation of the filter of FIG. 1, power is supplied to the solenoid 12 in order to produce a magnetic field which is sufficient to saturate the magnetic matrix 22, for example a field of five kilogauss. Moreover, a potential sufficient to polarize the filter relative to the remainder of the cooling system is connected between terminals 24 and each of terminals 26 and 28 so as to provide a potential difference. The applied voltage would be limited to prevent excessive electrolysis, an would, for example, be in the order of a few volts. With the filter energized as indicated above, and with the cooling solution with suspended particles flowing through the filter, particles with postive magnetic susceptibility (e.g., corrosion products) will be acted upon by the magnetic gradients to produce an attractive magnetic force which competes with the drag forces of the fluid or solution. If the magnetic force is dominant, the particle will be attracted to and trapped in the matrix 22. Since the hydraulic drag depends on the second power of the particle radius, while the magnetic attractive forces depend on the third power of the radius, i.e., particle volume, some point is reached as the particle size decreases where the drag force dominates, and hence at these small particle sizes, i.e. in the submicron range, the magnetic field is not effective to trap the suspended magnetic particles in the matrix 22. However, as the coolant flows through the filter, the charged surfaces of the filter, i.e. the surfaces of the vessel 2, pole pieces 16 and 18, and matrix 22 which are all conductively connected, attract these very small suspended, charged particulates in the coolant solution, causing these charged solid particulates to migrate and adhere to the charged surfaces of the filter. Since the filter matrix 22 represents the greatest surface area for the solution flow, most of the charged particles will be attracted to and deposited on the surface of the matrix 22.

In addition to enhancing the trapping of small magnetic particles, the electrophoretic effect produced in the filter will be operational on any suspended charged particle. Hence, suspended solids other than magnetic corrosion products, e.g., nonmagnetic particles such as silica, calcium and magnesium oxides, will be attracted to the surfaces of the filter, and in particular the surfaces of the matrix 22, and will be removed together with the corrosion products. Moreover, diamagnetic corrosion products such as cuprous oxide should likewise be trapped by the filter due to electrophoretic deposition. In short, the overall effect of enhancing the magnetic filter with the electrophoretic deposition process is to extend the total effectiveness of the high gradient magnetic filter as a suspended solids collector.

Figure 2:
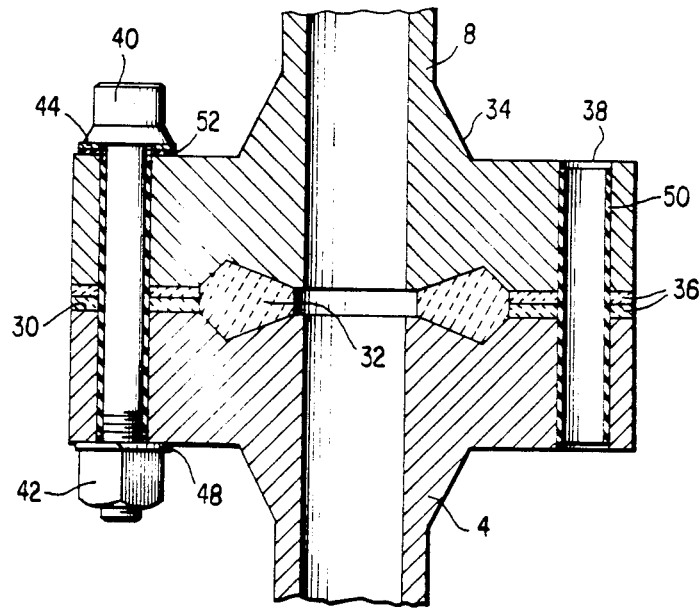
FIG. 2 is a schematic sectional view, at an enlarged scale, of a preferred embodiment of an insulated flange connection for a filter arrangement according to the invention shown in FIG. 1.

As indicated above, in order to provide the magnetic filter with the electrophoretic effect, it is necessary that the filter be connected in the cooling system such that it is electrically insulated from the remainder of the cooling system. FIG. 2 shows one preferred manner in which the flanges 4 and 6 may be securely mechanically connected to but electrically insulated from the flanges of the adjoining sections of pipe 8 and 10.

As shown in FIG. 2, the flange 4 is a standard stainless steel flange which has been welded to the pressure vessel 2, and whose end surface 30 has been machined to mate with the special contour of a compression sealing ring 32 of insulating material. The flange 34 for the pipe 8 is constructed in all respects similar to the flange 4 so that they provide matching surface contours when aligned as indicated in FIG. 2. The portion of the surface 30 of each of the flanges 4 and 34 which is not contoured to receive the compression sealing ring 32, is covered with a layer 36 of insulating material. According to the preferred embodiment of the invention, the insulating layers 36 are flame sprayed zirconia and the compression sealing ring 32 is likewise formed of the same insulating material, i.e. unfired zirconium oxide (zirconia). Zirconia was chosen for the material for the sealing ring 32 primarily because it is a good electrical insulator, and because it will not introduce new substances into the primary cooling stream since it is already present in the nuclear reactor cooling system as a film on the fuel rods. However, it is to be understood, that the insulating layers 36 and compression rings 32 may be formed of different insulating materials if desired.

In order to join and mechanically connect two flanges together, each of the flanges 4 and 34 is provided with a plurality of through bores 38 (only two of which are shown in the drawing) adjacent to and distributed about its periphery, with the bores 38 of both flanges being aligned when the flanges are positioned as shown with the compression ring contacting the surface 30 of each flange. A high strength bolt 40 is passed through each pair of aligned bores 38 and is engaged by a respective nut 42. Moreover, in a conventional manner, a steel washer 44 is disposed between the head of the bolt 40 and the underlying radial surface of flange 34, while a steel lock washer 48 is disposed between the nut 42 and the adjacent radial surface of flange 4. To prevent an electrical connection from being established between the two flanges 4 and 34 via the bolts 4, a sleeve 50 of insulating material is provided in each of the aligned pairs of through bores 38 so that the sleeve 50 surrounds the associated bolt 40, and a washer 52 of insulating material is provided between each washer 44 and the adjacent radial surface of the associated flange 34. With the arrangement just described, when the two flanges are fastened together by means of the bolts 40 and nuts 42, a good high pressure mechanical connection between the flanges 4 and 34 is provided but any electrical connection between the flanges is avoided. Preferaby the sealing ring 32 is dimensioned such that it will be squeezed between the flanges 4 and 34 when the nuts 42 are tightened on the bolts 40 to provide a good high pressure seal. Moreover, the thickness of the layers 36 is preferably such that the two layers 36 will just touch when the nuts 42 are properly tightened.

The electrophoretically enhanced high gradient magnetic filter described above may be cleaned in the manner conventional for magnetic filters of this type. That is, periodically the filter is simply isolated or removed from the cooling system to allow off-loading of the collected corrosion products to a waste disposal. The off-loading is accomplished in that, after the filter has been isolated, the matrix 22 is demagnetized and the filter back flushed. Since the magnetic forces on the particles have now been removed, the fluid drag during the back flushing is sufficient to entrain the particles and thus remove them from the matrix. Alterntively, in certain types of filter design, the back flushing may be accomplished by simply allowing the volume of water isolated in the filter, after removal from the cooling system and a demagnetization, to flash, so that a steamwater mixture is driven backwards through the matrix. In backflushing the electrophoretically augmented high gradient magnetic filter according to the invention, in addition to demagnetizing the matrix, the electrical charge on the filter should be neutralized prior to the back flush.

It will be understood that the above description of the present invention is susceptible to various modifications, changes and adaptations, and the same are intended to be comprehended within the meaning and range of equivalents of the appended claims.

We claim:

1. A method for collecting and trapping magnetic and nonmagnetic particles suspended in a liquid stream flowing in a pipeline in a nuclear power plant comprising: connecting a high gradient magnetic filter into a nuclear power plant coolant system pipeline through which a liquid stream containing undesired suspended magnetic and inorganic nonmagnetic solid particles is flowing so that the filter is electrically insulated from the pipeline; energizing the filter to create a high gradient magnetic field on the suspended particles flowing through the filter; and applying a potential to the magnetic filter so as to polarize the filter relative to the pipeline with a polarity opposite that of the charge on the suspended particles in the stream to create an electrical field in the filter, whereby larger magnetic particles will be trapped by the filter as a result of the magnetic effect while smaller magnetic particles and inorganic nonmagnetic particles will be trapped by the filter due to electrophoretic deposition.

2. In combination with a nuclear power plant having a coolant system, including at least one pipeline, through which flows a liquid coolant stream, a filter arrangement for removing magnetic and small inorganic nonmagnetic solid particles suspended in said liquid coolant stream comprising in combination:

a high gradient magnetic filter including a nonmagnetic metal pressure vessel of generally cylindrical shape having an opening at each of its ends, and means for producing a magnetic field with high gradients within said vessel to trap magnetic particles in said vessel including a solenoid and an associated yoke concentric with the outer surface of said vessel, first and second perforated magnetic pole pieces for said yoke disposed within said pressure vessel, and a matrix of magnetic material filling the space between said pole pieces;

means for mechanically connecting each open end of said pressure vessel to a respective length of pipeline of said coolant system in an electically insulating manner; and means for applying an electrical potential to at least said pressure vessel and said matrix to polarize same relative to the pipeline with a polarity opposite that of the charge on the particles suspended in a liquid stream flowing through said filter to trap small magnetic and inorganic nonmagnetic particles in said vessel.

3. A filter as defined in claim 2 wherein said pressure vessel is made of a non-magnetic stainless steel and said matrix is formed of a ferromagnetic stainless steel in the form of an expanded metal mesh having a large surface area composed of sharp-edged filaments.

4. A filter as defined in claim 2 wherein said means for mechanically connecting includes: a respective pipe flange connected to each end of said pressure vessel, each said flange having a portion of its end surface contoured to receive the outer contour of a compression sealing ring formed of an electrical insulating material and the remainder of its said end surface covered by a layer of electrical insulating material; and electrically insulated fastening means for fastening each said flange to a mating flange on said respective length of pipeline.

5. A filter as defined in claim 2 wherein a respective length of pipeline is connected to each end of said pressure vessel via said means for mechanically connecting; and wherein said means for applying an electrical potential having oppositely charged leads includes a source of d.c. potential electrically connected to said pressure vessel and each said respective length of pipeline.

6. A filter as defined in claim 5 wherein said means for mechanically connecting includes: a pair of contoured compression sealing rings of an electrical insulating material; a respective pipe flange connected to each end of said pressure vessel and a mating pipe flange at the end of each said length of pipeline, each said flange having a portion of its end surface contoured to receive the outer contour of one of sid compression sealing rings and the remainder of its said end surface covered by a layer of electrical insulating material; fastening means for fastening each of said flanges on said pressure vessel to the respective said mating flange with one of said compression rings therebetween; and means for electrically insulating said fastening means from at least one of said flanges of each pair of fastened flanges.

7. A filter as defined in claim 6 wherein: each of said flanges has a plurality of bores distributed about its periphery with the bores of a pair of fastened flanges being aligned; said fastening means includes a plurality of bolts with each bolt extending through a respective pair of aligned said bores, and a respective nut for each said bolt; and said means for electrically insulating includes a respective sleeve of electrical insulating material surrounding each said bolt, and a respective washer of electrical insulating material disposed on each said bolt for insulating same from a radial surface of at least one of said flanges of each pair of fastened flanges.

8. A filter as defined in claim 6, wherein said compression sealing rings comprise zirconia.

* * * * *